United States Patent
Hu

(10) Patent No.: US 8,291,127 B2
(45) Date of Patent: Oct. 16, 2012

(54) CIRCUIT FOR CONTROLLING PERIPHERAL DEVICE INTERFACE

(75) Inventor: Ke-You Hu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 663 days.

(21) Appl. No.: 12/426,938

(22) Filed: Apr. 20, 2009

(65) Prior Publication Data
US 2010/0250814 A1 Sep. 30, 2010

(30) Foreign Application Priority Data
Mar. 24, 2009 (CN) .......................... 2009 1 0301093

(51) Int. Cl.
*G06F 3/00* (2006.01)
*G06F 13/00* (2006.01)

(52) U.S. Cl. ................... 710/8; 710/5; 710/33; 710/36; 710/56

(58) Field of Classification Search ........................ None
See application file for complete search history.

(56) References Cited

U.S. PATENT DOCUMENTS

| | | | |
|---|---|---|---|
| 2006/0067393 A1* | 3/2006 | Fan | 375/229 |
| 2008/0198044 A1* | 8/2008 | Liu et al. | 341/26 |
| 2008/0274631 A1* | 11/2008 | Lee et al. | 439/78 |
| 2010/0167557 A1* | 7/2010 | Hoang | 439/62 |

OTHER PUBLICATIONS

Eternal Serial ATA White Paper, Sep. 2004, Silicon Image, [online, accessed on Oct. 22, 2011], URL: http://www.sata-io.org/documents/External%20SATA%20WP%2011-09.pdf.*

* cited by examiner

*Primary Examiner* — Scott Sun
(74) *Attorney, Agent, or Firm* — Altis Law Group, Inc.

(57) ABSTRACT

A circuit for controlling a peripheral device interface is to enable a central processing unit to detect a peripheral device. The circuit includes a control chip and first to sixth capacitors. The control chip includes a power supply input pin, first to second differential signal output pins, first to second differential signal input pins, and an expansion pin. The power supply input pin is connected to a power supply and grounded via the first and second capacitors in parallel. The first and second differential signal output pins are connected to the peripheral device interface via the third and fourth capacitors respectively. The first and second differential signal input pins are connected to the peripheral device interface via the fifth and sixth capacitors respectively. The expansion pin is grounded via a resistor.

8 Claims, 2 Drawing Sheets

CIRCUIT FOR CONTROLLING PERIPHERAL DEVICE INTERFACE

BACKGROUND

1. Technical Field

The present disclosure relates to circuits for controlling peripheral device interfaces and, particularly, to a circuit for controlling an interface of a storage device of an electronic device.

2. Description of Related Art

Peripheral device interfaces, such as external serial advanced technology attachments (ESATAs), are used by increasing numbers of users each year. These peripheral device interfaces help users to efficiently process data and information, and have an adaptive "hot plug" functionality to offer convenient assembly and disassembly of peripheral devices, such as hard disks.

When a peripheral device is coupled to an electronic device, such as a computer, via a peripheral device interface, a processor of the electronic device should immediately detect the peripheral device via a peripheral device interface control circuit. However, if the peripheral device is not capable of being consistently and stably detected by the processor, then interaction with the coupled peripheral device cannot take place.

DETAILED DESCRIPTION

Figure 1:
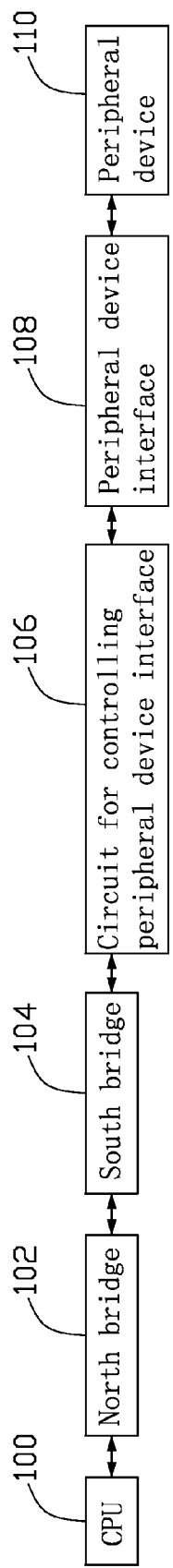
FIG. 1 is a block diagram of an exemplary embodiment of a circuit for controlling a peripheral device interface, together with a central processing unit (CPU), a north bridge, a south bridge, and a peripheral device interface.
Figure 2:
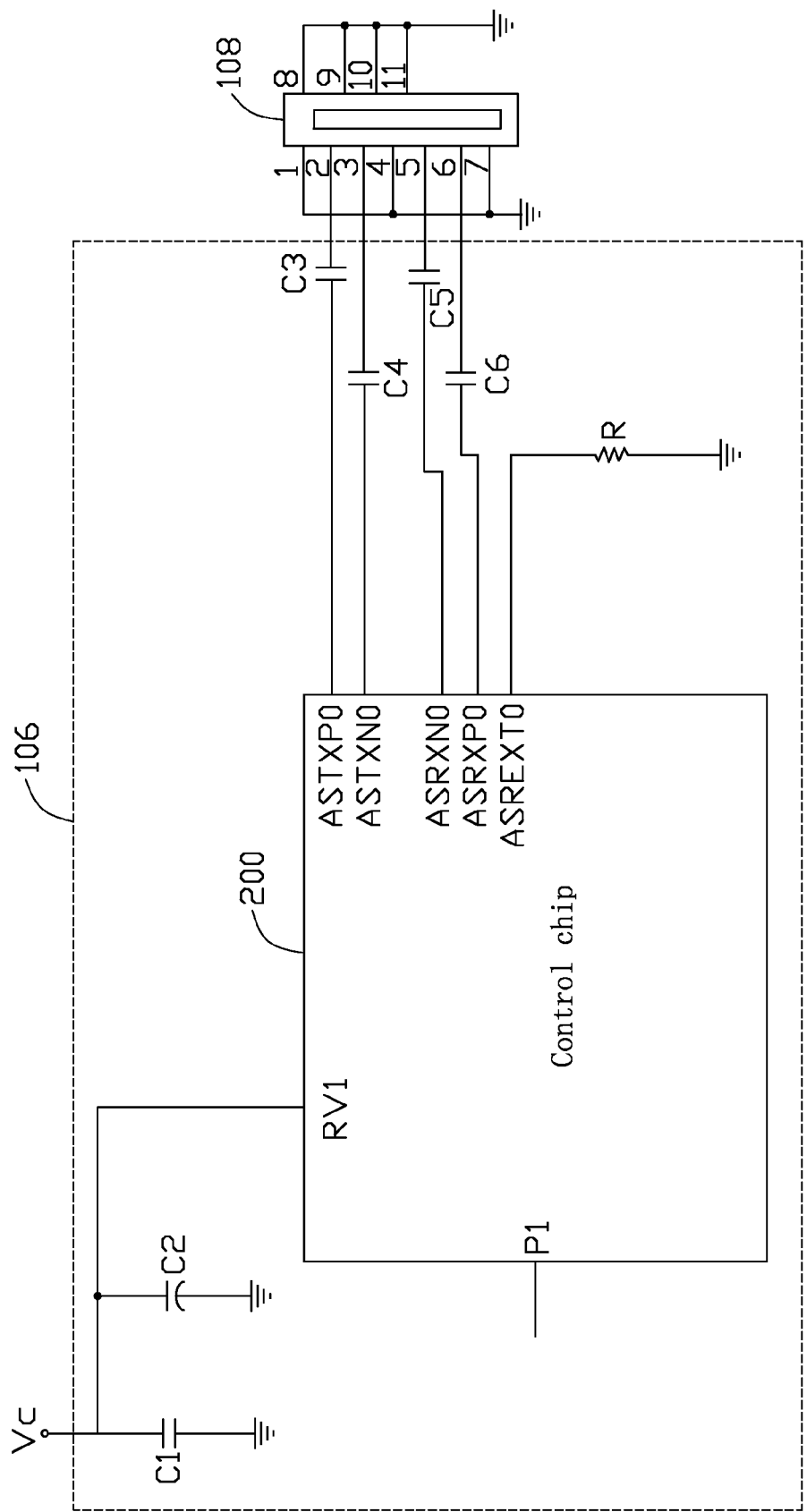
FIG. 2 is a circuit diagram of an exemplary embodiment of the circuit for controlling a peripheral device interface of FIG. 1 connected to the peripheral device interface.

Referring to FIGS. 1 and 2, an exemplary embodiment of a circuit 106 is configured for stably controlling a peripheral device interface 108 to enable a central processing unit (CPU) 100 to detect a peripheral device 110 connected to the peripheral device interface 108 via a north bridge 102 and a south bridge 104. The circuit 106 includes a control chip 200, six capacitors C1-C6, and a resistor R. In one embodiment, the peripheral device 110 can be a hard disk, the peripheral device interface 108 can be an external serial advanced technology attachment (ESATA) interface, capacitance of the capacitor C1 is 0.1 μF, capacitance of the capacitor C2 is 1000 μF, and capacitances of the capacitors C3-C6 are all 10 nF.

The CPU 100 is connected to the peripheral device interface 108 via the north bridge 102, the south bridge 104, and the circuit 106 for controlling the peripheral device interface 108.

When the peripheral device 110 is connected to the peripheral device interface 108, the control chip 200 receives a detection command sent from the CPU 100 via the north bridge 102 and the south bridge 104. The control chip 200 converts the detection command into an electronic signal and sends the electronic signal to the peripheral device interface 108 stably. The peripheral device interface 108 receives the electronic signal, and returns a notifying signal stably to the CPU 100 via the control chip 200, the south bridge 104, and the north bridge 102 to enable the CPU 100 to detect the peripheral device 110.

The control chip 200 includes a power supply input pin RV1, two differential signal output pins ASTXP0, ASTXN0, two differential signal input pins ASRXN0, ASRXP0, an input terminal P1, and an expansion pin ASREXT0. The peripheral device interface 108 includes seven ground pins 1, 4, 7, and 8-11, two signal input pins 2, 3, and two signal output pins 5, 6. The power supply input pin RV1 of the control chip 200 is connected to a power supply Vc, and is grounded via the capacitors C1 and C2 in parallel. The differential signal output pin ASTXP0 is connected to the signal input pin 2 of the peripheral device interface 108 via the capacitor C3. The differential signal output pin ASTXN0 is connected to the signal input pin 3 of the peripheral device interface 108 via the capacitor C4. The differential signal input pin ASRXN0 is connected to the signal output pin 5 of the peripheral device interface 108 via the capacitor C5. The differential signal input pin ASRXP0 is connected to the signal output pin 6 of the peripheral device interface 108 via the capacitors C6. The ground pins 1, 4, 7, and 8-11 are grounded. The input terminal P1 is connected to the south bridge 104. The expansion pin ASREXT0 is grounded via the resistor R, to provide stable voltages and currents between the differential signal output pin ASTXP0 and the signal input pin 2 of the peripheral device interface 108, between the differential signal output pin ASTXN0 and the signal input pin 3, between the differential signal input pin ASRXN0 and the signal output pin 5, and between the differential signal input pin ASRXP0 and the signal output pin 6. The capacitors C1, C2 provide stable voltages and currents for the power supply input pin RV1. The capacitors C3-C6 provide stable voltages and currents between the control chip 200 and the peripheral device interface 108. In one embodiment, the power supply Vc is a 1.8-volt direct current (DC) power supply, and resistance of the resistor R1 is 12 kΩ.

In use, the peripheral device 110, such as a hard disk, is connected to the peripheral device interface 108. The CPU 100 sends the detection command to the control chip 200 of the circuit 106 via the north bridge 102 and the south bridge 104. The control chip 200 converts the detection command into the electronic signal and sends the electronic signal to the signal input pins 2, 3 of the peripheral device interface 108 via the differential signal output pins ASTXP0, ASTXN0. The signal output pins 5, 6 of the peripheral device interface 108 stably return the notifying signal to the differential signal input pins ASRXN0, ASRXP0. The control chip 200 processes and sends the notifying signal to the CPU 100 via the south bridge 104 and the north bridge 102 to enable the CPU 100 to detect the peripheral device 110.

Through experiments, the circuit 106 for controlling the peripheral device interface 108 can stably work, and the CPU 100 can also detect the peripheral device 110 normally.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the embodiments to the full extent indicated by the broad general meaning of the terms in which the appended claims are expressed.

What is claimed is:

1. A circuit for controlling a peripheral device interface to enable a central processing unit (CPU) to detect a peripheral device normally, the circuit comprising:
   first to sixth capacitors; and
   a control chip comprising:
      a power supply input pin connected to a power supply, and grounded via the first and second capacitors in parallel to make voltages and currents of the power supply input pin stable;

a first differential signal output pin connected to the peripheral device interface via the third capacitor;

a second differential signal output pin connected to the peripheral device interface via the fourth capacitor;

a first differential signal input pin connected to the peripheral device interface via the fifth capacitor;

a second differential signal input pin connected to the peripheral device interface via the sixth capacitor; and an expansion pin grounded via a resistor to provide stable voltages and currents between each of the first and second differential signal output pins, the first and second differential signal input pins, and the peripheral device interface;

wherein when the peripheral device is connected to the peripheral device interface, the control chip receives a detection command from the CPU, and converts the detection command into an electronic signal and sends the electronic signal to the peripheral device interface via the third and fourth capacitors stably, the peripheral device interface returns a notifying signal to the CPU via the fifth capacitor, the sixth capacitor, and the control chip to enable the CPU to detect the peripheral device.

2. The circuit of claim 1, wherein resistance of the resistor is 12 kΩ.

3. The circuit of claim 1, wherein the power supply is a 1.8-volt power supply.

4. The circuit of claim 1, wherein capacitance of the first capacitor is 0.1 µF, capacitance of the second capacitor is 1000 µF, and capacitances of the third to sixth capacitors are all 10 nF.

5. A system for controlling a peripheral device interface to enable a central processing unit (CPU) to detect a peripheral device normally, the system comprising:

a north bridge connected to the CPU;

a south bridge connected to the north bridge; and a circuit connected between the south bridge and the peripheral device, the circuit comprising:

first to sixth capacitors; and a control chip comprising:

a power supply input pin connected to a power supply, and grounded via the first and second capacitors in parallel to make voltages and currents of the power supply input pin stable;

a first differential signal output pin connected to the peripheral device interface via the third capacitor;

a second differential signal output pin connected to the peripheral device interface via the fourth capacitor;

a first differential signal input pin connected to the peripheral device interface via the fifth capacitor;

a second differential signal input pin connected to the peripheral device interface via the sixth capacitor; and an expansion pin grounded via a resistor to provide stable voltages and currents between each of the first and second differential signal output pins, the first and second differential signal input pins, and the peripheral device interface;

wherein when the peripheral device is connected to the peripheral device interface, the control chip receives a detection command from the CPU via the north bridge and the south bridge, and converts the detection command into an electronic signal and sends the electronic signal to the peripheral device interface via the third and fourth capacitors stably, the peripheral device interface returns a notifying signal to the CPU via the fifth capacitor, the sixth capacitor, the control chip, the south bridge, and the north bridge to enable the CPU to detect the peripheral device.

6. The system of claim 5, wherein resistance of the resistor is 12 kΩ.

7. The system of claim 5, wherein the power supply is a 1.8-volt power supply.

8. The system of claim 5, wherein capacitance of the first capacitor is 0.1 µF, capacitance of the second capacitor is 1000 µF, and capacitances of the third to sixth capacitors are all 10 nF.

* * * * *